INVENTORS
ROBERT N. STEEL
PAUL V. BUTSCH
RICHARD T. NOJIRI
BY James J. Long
AGENT Aug. 19, 1969    R. N. STEEL ET AL    3,462,326
METHOD OF MAKING A LEATHER-LIKE
MICROPOROUS SHEET MATERIAL Filed May 31, 1966    3 Sheets-Sheet 2

INVENTORS
ROBERT N. STEEL
PAUL V. BUTSCH
RICHARD T. NOJIRI
BY James J. Long
AGENT

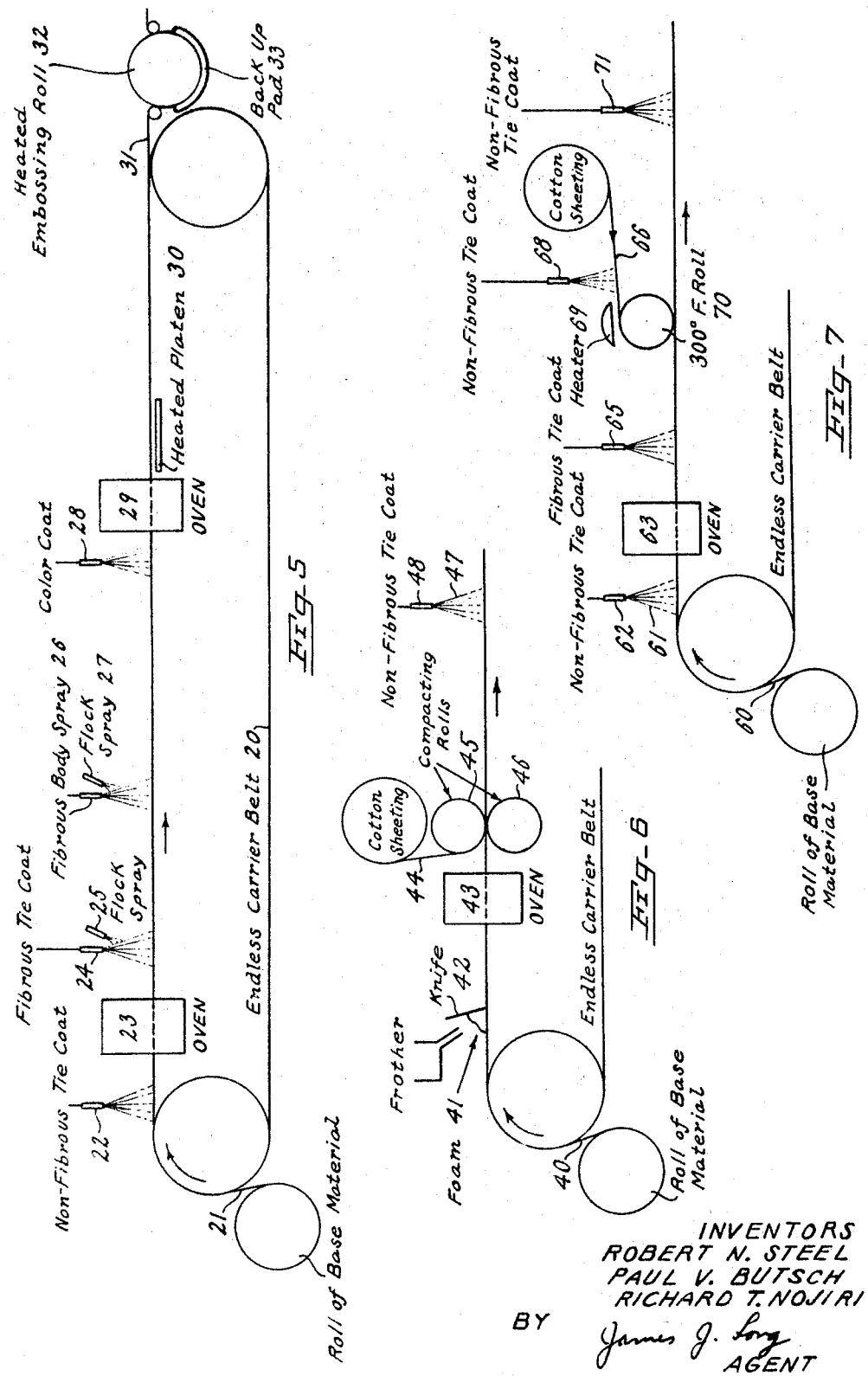

United States Patent Office 3,462,326
Patented Aug. 19, 1969

3,462,326
METHOD OF MAKING A LEATHER-LIKE
MICROPOROUS SHEET MATERIAL
Robert N. Steel and Paul V. Butsch, South Bend, and Richard T. Nojiri, Mishawaka, Ind., assignors to Uniroyal, Inc., New York, N.Y., a corporation of New Jersey
Filed May 31, 1966, Ser. No. 554,162
Int. Cl. B32b 27/40, 31/12
U.S. Cl. 156—72                                       8 Claims This invention relates to a leather-like microporous sheet material and to a method of making same.

The invention is directed to a breathable leather-like material comprising a fibrous base, united to a non-woven fibrous elastomeric polyurethane body. This permeable product typically comprises a non-woven base fabric, and essentially a second non-woven fabric layer which has been developed on top of the first non-woven layer by spray methods.

In one aspect the invention is directed to a leather-like sheet material comprising a base fabric, such as a non-woven base batt of randomly interlaced textile fibers (although a woven or knitted base fabric may be used, or leather may be used as a base material), a particulate elastomeric tie coat on said base fabric, and a layer of polyurethane elastomeric fibers, which may be mixed with flock, on said tie layer. In a modification of the invention, particularly when a non-woven base is used, a further reinforcing fabric is laminated in the assembly to give added strength.

More particularly, the invention typically contemplates the provision of a permeable base batt of non-woven randomly interlaced non-elastomeric fibers having for example a permeability to water vapor of at least 10 grams per hour per square meter. An elastomeric non-fibrous adhesive composition is applied; usually the adhesive is sprayed into the form of tacky discrete particles which are deposited on the surface of the batt to form a permeable layer of discrete solid elastomeric particles which adhere to each other and to the batt, to form a porous, adhesive tie layer. Subsequently, a solution of a polyurethane elastomer (further containing a vinyl resin if desired) is sprayed to form tacky fibers, which may be intermingled with flock while suspended in air. The resulting sprayed tacky fibers are deposited on the assembly to form a permeable adherent batt thereon. The assembly is finally compacted by pressing the assembly with a heated pressing means.

The product has a fibrous structure, and consequent porosity, or water vapor transmission, permeability, etc., equivalent to that of leather. Further, the end product has a "hand" or "feel" equivalent to that of leather.

The invention will be described in greater particularity with reference to the accompanying drawings, wherein:

FIG. 5 is a diagrammatic elevational view of an arrangement of apparatus suitable for practicing the invention; and FIGS. 6 and 7 are similar partial views of modified apparatus.

The microporous leather-like material of the invention is built up upon a base which is woven or knit fabric, or more typically a non-woven batt, ordinarily a non-woven air-laid needle punched batt having for example a thickness of from 0.01 to 0.10 inch, preferably 0.02 to 0.08 inch. This batt may be made up for example of synthetic fibers such as nylon fiber, polypropylene fiber, polyester fiber, rayon, or natural fibers such as cotton, or mixtures thereof, approximately 1 to 2 inches long, using an adhesive material as a binder, such as an elastomer latex, e.g., a polyurethane latex, SBR latex, natural rubber latex, NBR latex, acrylic polymer latex, etc. Polyurethane latex is preferred. The fibers are relatively inextensible, as distinguished from elastomeric fibers. The fibers are generally crimped. The batt so made is ordinarily virtually non-directional, but for some applications it may be desirable to use a directional non-woven base.

One form of base batt useful in the invention is the kind which can be stretched, for example 90–100%, and which is sometimes referred to as Z-compacted. Such batt may be made in known manner by an operation in which the fibers are caused to be crowded back into one another, causing at least some of the fibers to take a Z configuration. This type of compaction is achieved in non-woven webs by processes shown in U.S. Patents 2,624,245 and 3,055,496. Such non-wovens have an extensibility, or stretchiness, substantially equal to the length of fiber "lost" in producing the Z form. Leather may also be used as the non-woven fibrous base batt.

The base batt is permeable to both water and air, the permeability value being as a minimum 10 grams of water vapor per hour per square meter (as measured by a test to be described below). Considerable latitude in the permeability of the starting batt is permissible and there does not appear to be any critical upper limit. Thus, a base batt having a relatively high water vapor permeability of 30 to 50 or more grams per hour per square meter may be used.

Figure 1:
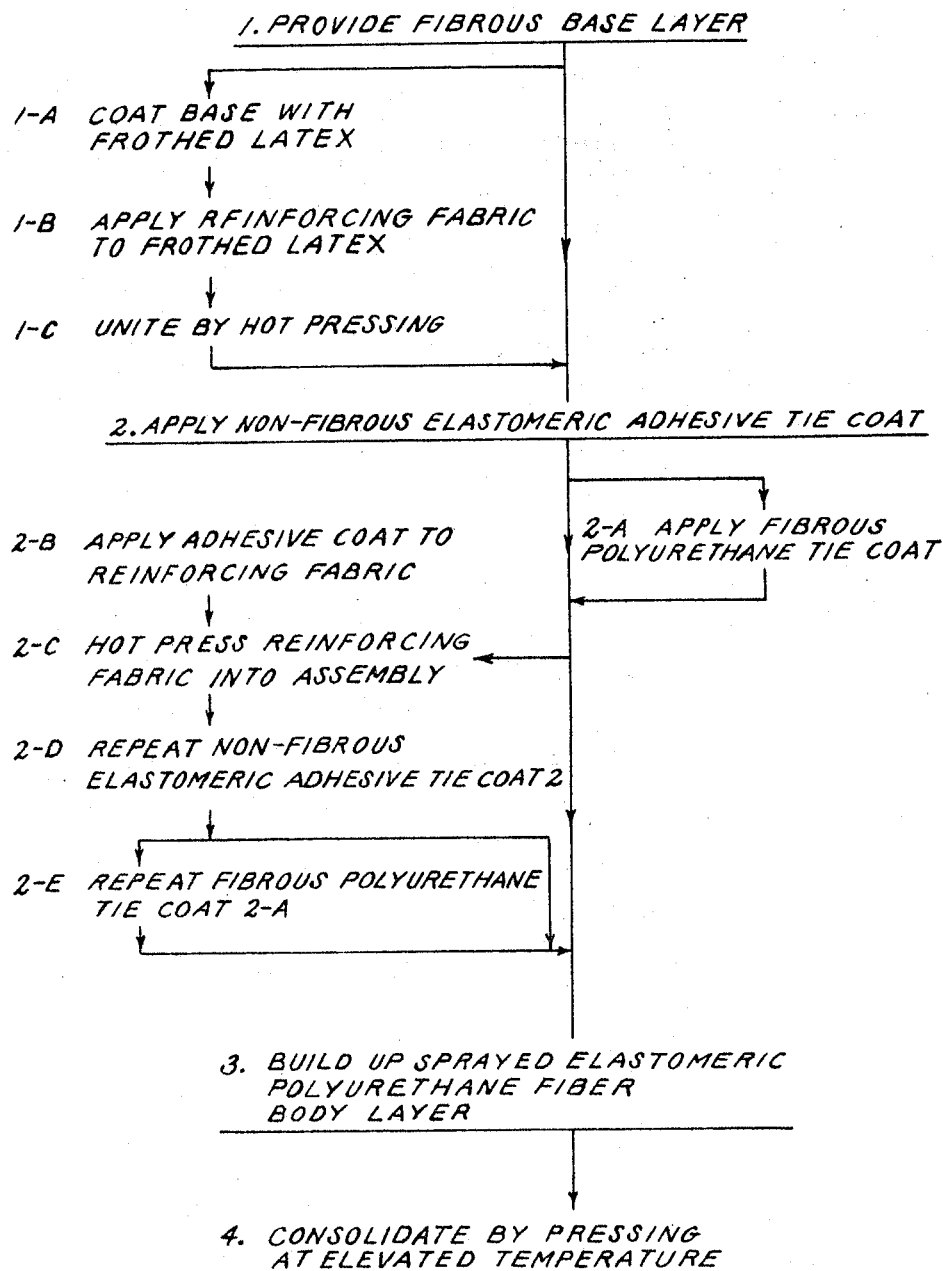
FIG. 1 is a flow diagram representing typical successive steps in carrying out the invention.

Referring to the accompanying drawings, and particularly to the flow diagram, FIG. 1, the provision of such a base batt is represented therein as step 1.

The non-woven base batt is preferably buffed to make the gauge of the batt more uniform, and to soften the non-woven material. One or both surfaces of the batt may be buffed. If only one surface of the batt is buffed, generally the buffed surface becomes the back or underside of the product.

The front or upper surface of the non-woven base batt is then typically provided with a light coat of polyurethane latex (step 2, FIG. 1). This light coating of polyurethane latex is applied by conventional methods, such as by spraying or print coating, typically in a thickness of approximately 1–4 mils. This sprayed or print coated adhesive coating is non-fibrous; it is not a continuous film, but is deposited as discrete particles or globules so that the discontinuous coating produced is permeable. The discontinuous nature of this light adhesive coating is enhanced by the discontinuous nature of the non-woven surface to which it is applied by spraying or print coating. The coating is not so heavy as to seal the base, thereby rendering it impermeable. The individual particles themselves are solid, non-porous. The adhesive coating is then dried, for example by passing the batt through a heated oven to remove the water. Other adhesive materials, particularly elastomeric materials, such as neoprene latex, nitrile rubber latex, SBR latex, carboxylated latex, or natural rubber latex may be used for this coating. It is also possible to make use of solutions of elastomers, including polyurethanes, in this step. However, it is preferred to use polyurethane latex. The adhesive coat acts as a tie-coat or tie-layer to bond subsequent layers to the base.

Preferably an additional, fibrous tie-coat is then applied (step 2-A, FIG. 1). Such fibrous tie layer is applied by spraying a composition comprising a solution of a polyurethane elastomer, preferably a solution of a polyurethane elastomer in admixture with a polyurethane latex. The polyurethane elastomer employed in this and other steps of the process is a conventional material and may be described as a reaction product of a polymeric polyol, frequently a polyester or polyether having at least two terminal hydroxy groups, and an organic polyisocyanate, usually a diisocyanate; conventionally a bifunctional chain extending agent having two active hydrogen atoms (such as for example water, diamines, amino alcohols, hydrazine, diols, etc.) is also included. In conventional practice the starting polyol frequently has a molecular weight of from 400 to 6000 and a functionality (number of reactive hydroxyl groups) between 2 and 6 per molecule. Mention may be made of polyesters made from a glycol (e.g., ethylene or propylene glycol) and a saturated organic dicarboxylic acid (i.e., adipic acid). Usually the glycol contains from 2 to 20 carbon atoms and the acid contains from 4 to 12 carbon atoms. Polyethylene adipate, polyethylene adipate-phthalate, polyneopentyl sebacate, etc. may be mentioned. There may also be mentioned such polyethers as polypropylene glycol, polypropyleneethylene glycol and polytetramethylene glycol.

In the category of polyester-based polyurethanes we include those based on caprolactones such as poly (epsilon) caprolactone as described in U.S. Patent 2,933,478 or 3,186,971, or Rubber Age, July 1965, pages 86–93.

Among the isocyanates conventionally used may be mentioned m- and p-phenylene diisocyanate, toluene diisocyanate, p,p'-diphenylmethane diisocyanate, p,p'-diphenyl-3,3'-dimethyl (or dimethoxy) diisocyanate, 1,5-naphthylene diisocyanate etc.

Other suitable polyurethane elastomer producing ingredients are disclosed in "German Plastics Practice," by De Bell and Richardson, Springfield, Mass., March 1946; Otto Bayer in "Angewandte Chemie," A/59 (1947), No. 9, page 264; Modern Plastics, vol. 24 (1947), No. 10, page 149; U.S. Patent 2,927,905, Eckert, Mar. 9, 1960; 2,866,744, Price, Dec. 30, 1958.

The polyurethane elastomer solution employed in spraying the fibrous tie layer is made by dissolving the polyurethane elastomer in any suitable conventional volatile organic solvent such as tetrahydrofuran (preferred) or dimethylformamide, etc., usually in amount sufficient to provide in the spraying composition about 4 to 12 parts (all quantities are expressed herein by weight unless otherwise indicated) of the dissolved polyurethane per 100 parts of solvent. Preferably, the spraying composition further includes a quantity of elastomers polyurethane aqueous latex, for example in amount sufficient to provide from 1 to 3 parts (dry basis) of polyurethane in latex form per 100 parts of solvent. The solution may further include a vinyl resin, such as polyvinyl chloride or other vinyl resin resin (in proportions for example, 0 to 40 parts PVC in correspondingly 100 to 60 parts polyurethane). Good results have been obtained with a composition containing 20 parts of unplasticized polyvinyl chloride resin per 100 parts of ployurethane elastomer. Fillers, pigments, etc., can also obviously be added as desired. This composition is sprayed toward the surface of the base batt bearing the previously described particulate adhesive tie layer, the conditions of spraying being such that the spray produces fibers of polyurethane. It is desirable to employ electrostatic spray apparatus, as this appears to result in a finer fibrous spray, and an appreciable reduction in the amount of overspray losses. At the same time there is optionally directed toward the base batt a stream of fibrous flock carried in an air stream. The flock becomes intermingled with the sprayed polyurethane fibers, in such manner that there is deposited on the prepared surface of the batt a layer of polyurethane fibers blended with flock. The flock is preferably a cellulosic flock, but other flock materials such as nylon flock, polyester fiber flock, polypropylene flock, rayon flock, leather particles, particles of vinyl resin, etc., or mixtures thereof, may be used.

The relative quantities of flock and polyurethane fibers applied are usually such that there is in the polyurethane-flock blend from 3% to 15% by weight of flock, based on the weight of polyurethane solids. It is preferable that the conditions (distance of spray nozzle from the batt, air pressure, etc.) be adjusted so that the polyurethane fibers from the spray be essentially dry, i.e. non-flowable (although having some adhesion or tackiness) in order that there be no undue flow of deposited material such as would tend to close off the surface and result in a non-fibrous lay-down. The sprayed polyurethane fibers frequently have a diameter of approximately 1 to 3 microns, and they vary in length from ¼ inch or less to 2 or 3 inches or more. Normally one pass of the spray gun is sufficient to apply the amount of material required in this second or fibrous tie-coat, which is usually approximately 0.5–3 mils thick. The polyurethane latex employed in the formulation used to deposit this second tie layer renders the tie layer more adhesive and tacky, the better to receive the next applied body layer. The polyurethane fibers themselves are solid (non-porous) but the layer as a whole is porous by reason of the spaces or channels between the fibers.

Thereafter a second polyurethane solution is sprayed onto the second or fibrous tie layer to build up a body layer of fibers (step 3, FIG. 1). This solution may again be based upon a polyurethane elastomer as previously described, dissolved in tetrahydrofuran or other suitable volatile organic solvent. The concentration of polyurethane in the solution will frequently be from 5 to 25 parts, per 100 parts of solvent. Again, this solution may contain vinyl resin (e.g., 0 to 40 parts PVC in correspondingly 100 to 60 parts polyurethane). Filler, etc. may also be added. As before, an air stream containing flock is optionally simultaneously sprayed into the path of the sprayed polyurethane fibers so that the flock and initially tacky or adherent polyurethane fibers intermingle and are deposited in random admixture onto the second tie layer. Again, there is usually from 3% to 15% by weight of flock based on the weight of the polyurethane fibers. In this spraying step the polyurethane fibers produced again frequently have a diameter of approximately 1 to 3 microns and they vary in length from ¼ inch or less to 2 or 3 inches or more. In this spraying step a layer of mixed fibers about 1 to 3 mils thick is deposited on each pass of the spray device, and the operation is repeated a sufficient number of times to build up the desired thickness in this fibrous deposit, usually a thickness of from 20 to 70 mils. The fibers as deposited are weakly tacky or self-bonding although they are sufficiently dry to prevent any appreciable flow in the material as it strikes the surface onto which it is sprayed. The fibers soon after spraying become essentially non-tacky as the last traces of solvent evaporate. The polyurethane fibers themselves are solid (non-porous) but the deposit as a whole is porous because of the spaces or passages between the intermingled, adhered fibers.

The flock, intermingled with the sprayed polyurethane fibers as described, serves to increase the permeability of the sheet material.

Next, the exposed surface of the thus built-up body layer may have a color coating or other finishing coating or treatment applied thereto. Thus, the exposed surface may be sprayed with an aqueous solution of a water-soluble dye to provide a desired color. After drying, a finish coating may be applied, conveniently by spray techniques (preferably electrostatic) using for example a pigmented solution of cellulose nitrate and polyurethane, or a solution of acrylic resin or vinyl resin, or blends of such materials, or an acrylic latex containing a coloring dye. Conventional finishes for coloring, providing desirable slip characteristics, or improved abrasion resistance, may be used. Such coatings are applied lightly so as not to fill up the surface pores of the material.

After application of any desired coating and drying, the assembly is next hot pressed to compact and consolidate the fibrous polyurethane layers, without however destroying the porous nature of the fibrous layer and without destroying the capillary action or permeability of the material (step 4, FIG. 1). For this purpose the material may be pressed between heated plates or passed under a heated roll (see, for example, U.S. Patent 3,157,723), suitably heated for example to a temperature within the range of from 180° F. to 350° F., in such manner as to reduce the thickness of the assembly to about 50–85% of its original thickness. The original thickness of the entire assembly prior to compaction is usually within the range of from about 50 to about 125 mils. After compaction the thickness of the entire assembly is frequently within the range of from about 25 to 110 mils. This reduction in thickness takes place entirely in the sprayed polyurethane fiber body, which decreases from its applied thickness range of for example about 15 to 70 mils to a typical final compacted thickness range of about 5 to 25 mils. Usually a desired surface characteristic, frequently a leather-like grain, is imparted to the top or front surface of the assembly in the course of this hot compacting operation, with the aid for example of a conventional engraved or electrolytically patterned, heated, embossing roll.

Figure 2:
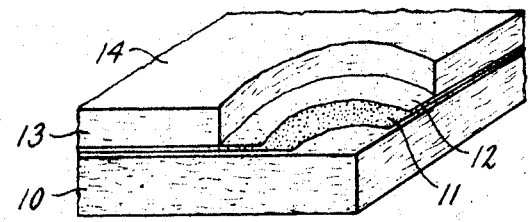
FIG. 2 is a fragmentary perspective view, with parts broken away, of a typical product of the invention.

Referring to FIG. 2, the embodiment of the invention shown therein is seen to comprise a non-woven base batt 10 as previously described, coated with a nonfibrous adhesive layer 11, followed by a fibrous tie coat 12, upon which is built up the sprayed elastomeric polyurethane fiber body layer 13, the front or upper surface 14 of which bears a color coating and is embossed with a leather-like grain during the final hot compacting operation.

Referring to FIG. 5, one convenient apparatus for assembling a product of the invention includes a continuously advancing endless carrier belt 20 onto which is fed a base batt 21. A spray device 22 serves to apply the adhesive non-fibrous tie coating composition to the surface of the advancing batt, which then passes into an oven 23 where it is dried. After emerging from the oven a further spray device 24 serves to apply the polyurethane fibrous tie coat while flock is simultaneously sprayed from an adjacent spray device 25. Thereafter, the body layer of polyurethane fibers is sprayed from a spray device 26, together with a flock spray 27. It will be understood that the spray devices are duplicated in sufficient number to cover the whole width of the base batt to the desired thickness, although only a minimal number of spray devices are illustrated in the drawing, for simplicity. Also, the spray devices may be mounted on conventional traversing mechanisms (not shown) so as to pass back and forth transversely across the width of the sheet material as it advances longitudinally on the carrier belt to distribute the sprays uniformly. Thereafter the color coat is applied from one or more sprays 28 and the assembly is dried with the aid of an oven 29 and/or heated platens 30. Finally, the product 31 is withdrawn from the carrier belt and continuously advanced into the nip between a heated rotating embossing roll 32 and a conformable back-up member 33 (see U.S. Patent 3,157,723) wherein the product is compacted and embossed on its upper surface at elevated temperature. The embossing roll 32 is heated to a temperature sufficiently elevated to soften and emboss the polyurethane surface, for example, a temperature of 180°–350° F. The back-up member 33 conforms to the curvature of the embossing roll 32 over a considerable portion of the periphery so as to present therebetween an extended nip in which the product is confined and pressed evenly over an extended arcuate portion of the roll surface. The back-up member may comprise an inflatable device of the kind shown in 3,157,723, or it may comprise a solid, conformable, resilient pad of rubber or the like. It is desirable that the back-up member have an anti-friction surface over the area that contacts the back of the product, such as a polytetrafluoroethylene surface. Less preferably a roll may be employed as the back-up member, but in that case the speed with which the product passes through the more limited nip presented must be reduced. Prior to the compacting and embossing the product has a visibly fibrous upper surface, but after the embossing, the exposed upper surface, although still porous, does not have a perceptible fibrous quality. Within the sprayed polyurethane fiber body layer the fibers after the compacting step are less distinct than they were prior to the compacting step, but the fibrous nature of this layer can still be detected by microphotography, which reveals a consolidated but still porous structure.

It is sometimes desirable to introduce a sheet of Mylar (polyester) between the surface being embossed and the surface of the embossing roll to provide a desired surface finish. The Mylar sheet may be either a high gloss material or may have a matte finish, the choice depending on the surface finish desired on the product (see U.S. Patent 2,801,949). The Mylar sheet may be stripped from the surface of the product immediately after it passes through the embossing nip.

In some cases it may be desirable to provide an assembly having increased strength. For this purpose one or more layers of relatively inextensible reinforcing fabric may be incorporated in the assembly. The reinforcing fabric is typically a sheet of woven or knit fabric, although a high strength non-woven fabric may also be used. The reinforcing fabric may be applied to the lower (back) surface of the base batt, or to the upper (front) surface of the base batt in which case it will be interposed between the base batt and the built-up body of sprayed polyurethane fibers. The reinforcing fabric may be adhered to the assembly with the aid of frothed latex or other suitable adhesive coats, such as the previously described elastomeric non-fibrous tie coat and fibrous polyurethane tie coat. When the reinforcing fabric is adhered with the aid of frothed latex, the fabric may be applied to the froth with light pressure while the froth is still wet, after which the assembly is dried and hot pressed; more preferably the froth is first dried and then the fabric is applied and hot pressed into the assembly.

Figure 3:
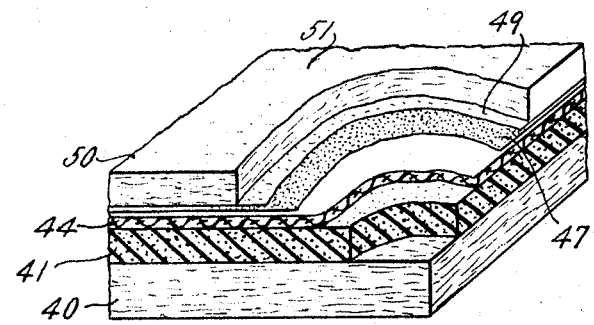
FIGS. 3 and 4 are similar views of modifications of the invention.

Thus, one such modification of the invention, as indicated in steps 1–A, 1–B, and 1–C in FIG. 1 and as shown in FIGS. 3 and 6, involves depositing on the front (upper) surface of a base batt 40 a layer of frothed latex 41, such as a frothed polyurethane elastomer latex, for example by means of a knife coater 42 (FIG. 6), in a thickness of about 0.02 to 0.2 inch. Other elastomers useful in place of polyurethane froth are froths made from SBR, natural rubber, nitrile rubber, neoprene, carboxylated latices, and blends of the previous as well as frothed vinyls and frothed acrylics. The foam is formed merely by whipping latex (total solids of, for example, 40 to 60%) in a mixer to provide a wet density of, for example, from 100 to 250 grams per liter. The frothed layer is then dried, for example in a heated oven 43. The layer of reinforcing fabric 44 is then hot pressed into the surface of the dried foam rubber layer typically by passing the fabric and the belt carrying the assembly through the nip between an upper heated rotating compacting roll 45 (temperature 180° F.–350° F.) and a lower back-up roll 46 (which need not be heated) to press the fabric firmly into the dried froth. The froth becomes compacted to about 20–40% of its original thickness. Thereafter a tie coat 47 of polyurethane latex adhesive (step 2, FIG. 1) may be applied by means of a spray device 48 and the remaining steps of the process carried out as before to complete the assembly. As shown in FIG. 3, the final product includes the fibrous sprayed tie layer 49, and built-up sprayed polyurethane fiber body 50 with color-coat and embossed surface 51.

Figure 4:
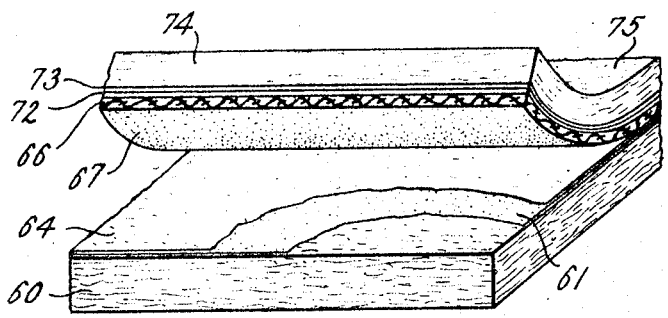

Another way of incorporating reinforcing fabric is indicated in steps 2–B, 2–C, 2–D and 2–E of FIG. 1 and in FIGS. 4 and 7. This involves applying to a base batt 60 a non-fibrous elastomeric adhesive tie coat 61 (by means of spray 62, FIG. 7) followed by drying in an oven 63 and if desired by application of a fibrous polyurethane tie coat 64 from a spray 65, all as previously described in the principal embodiment of the invention (steps 1, 2 and 2-A of FIG. 1). A reinforcing fabric 66 (FIGS. 4 and 7) is then coated (step 2-B, FIG. 1) with a non-fibrous elastomeric adhesive tie layer 67 (FIG. 4) from a spray 68 (FIG. 7). The deposit is dried by means of a heater 69 and then the adhesive coated reinforcing fabric is pressed (step 2-C, FIG. 1) firmly onto the assembly with the aid of a heated (180° F.–350° F.) roll 70. Subsequently a spray 71 applied another particulate or non-fibrous elastomeric adhesive tie coat 72 (FIG. 4; step 2-D in FIG. 1) followed by a fibrous polyurethane tie coat 73 if desired (step 2-E, FIG. 1). The described built-up body of sprayed polyurethane fibers 74 having a color-coated and embossed surface 75 completes the assembly.

The product of the invention displays excellent dimensional stability so important in the manufacture of footwear uppers. The folding property also resembles closely that of leather. The term "folding" refers to the property sometimes designated as "break" or "crease" in connection with leather, to describe the way in which real leather tends to form a break or crease at the surface when subjected to a folding action. The present product has the formability which is characteristic of natural leather. The term "formability" refers to the sheet material's ability to form to the molds, lasts, etc., generally used to provide a shape to a desired end product; thus, like natural leather, the present material can be stretched over and conformed to a last in making a shoe. The described reinforcing fabric improves the strength, dimensional stability, formability and folding in the end product.

An example of a polyurethane elastomer useful in the invention is the reaction product of 1 mole of polytetramethylene glycol having a molecular weight of 2,000, 1 mole of butanediol, and 2 moles of diphenylmethane diisocyanate. Such a product having a hardness of 60–65 (Shore A durometer) and a viscosity of .25–.5 poise (at room temperature in a 10% by weight solution in tetrahydrofuran) is particularly suitable for use in making the polyurethane solution used to deposit the intermediate fibrous tie coat (step 2-A in FIG. 1). Another polyurethane elastomer, particularly useful in building up the main body of sprayed polyurethane fibers (step 3, FIG. 1) is a similar reaction product, but derived from polytetramethylene glycol having a molecular weight of 1,000 instead of 2,000 (1 mole of such glycol are reacted with 2 moles of butane diol and 3 moles of diphenylmethane diisocyanate). Such a lower molecular weight glycol is conducive to formation of a greater percentage of urethane groups, and the product is harder, having a Shore A hardness of 90–95. This elastomeric polyurethane also has a higher viscosity of .75–1.5 poises (10% solution in tetrahydrofuran). This higher softening product is particularly suitable for the main built-up fibrous elastomeric body layer (step 3, FIG. 1) because it requires a higher embossing temperature and consequently retains the embossed detail better under the conditions of elevated temperatures to which the leather-like sheet may be subjected in use.

A polyurethane elastomer latex suitable for use in the invention may be made in any suitable conventional manner. Thus, to make a polyurethane latex the above-described polyurethane elastomer having a Shore A hardness of 60–65 may be banded on a 310° F. mill for 5–10 minutes; the mill may then be cooled down with the polymer banding and the resultant crumbs collected. A 6% solids by weight solution of the polymer in methylene chloride is prepared. The mixture is put in a blender to make a smooth cement which is a viscous material. With the aid of a colloid mill the cement is emulsified with water and surface active materials as follows:

Ingredients:
  Cement:
    Polyurethane elastomer _____ g__ 1500
    Methylene chloride _____ gal__ 5
  Triton X-100 (alkyl phenoxy polyethoxy alcohol) _____ g__ 150
  Sodium lauryl sulfate _____ g__ 150
  KOH _____ g__ 10
  Water _____ gal__ 5

After the emulsion is prepared, the methylene chloride is stripped off using steam. The liquid temperature is raised to 85° C. The resulting latex may be creamed if desired to raise the solids content.

The following example will serve to illustrate the practice of the invention in more detail.

There is provided a non-woven, air-laid, needle punched base batt having a thickness of .045 inch. This batt is made up of crimped filaments of nylon and polypropylene, approximately 1½ inch long, bound together with a polyurethane latex binder. Specifically, the batt consists of (by weight) 75 parts of 3-denier nylon fiber, 25 parts of 3-denier polypropylene fiber and 100 parts (dry basis) of polyurethane latex. The batt is virtually non-directional, and has a permeability to water vapor of 15 grams per hour per square meter. The water vapor transmission or permeability may be measured by ASTM test E–96–53T, modification B, with further modifications if desired, for example as follows: Circular samples 1.75 inches in diameter are cut from the sheet to be tested. A bottle 2⅛" in diameter and 3½" tall, having a rim diameter of 1¾" at the outside, is provided; the bottle rim is dipped in molten beeswax-paraffin mixture to provide a seal and 50 cc. of distilled water is added to the bottle as a source of moisture. The sample is placed over the mouth of the bottle and clamped with a clamping lid having a circular opening of 1.96 square inch area. To provide a good seal between the test piece and the wax, the clamping lid is preheated on a hot plate; it is screwed down to a tight fit without wrinkling the sample. The water surface is 2 inches below the surface of the test material. The test bottle is weighed and placed in a two quart container with 300 grams of activated silica gel, 3 to 8 mesh, as a desiccant, at 75° F. The container is closed. Thus, we have essentially a condition of 100% relative humidity inside the test bottle, and a condition approximately zero relative humidity exteriorly of the test bottle but inside the desiccant container. The test bottle is removed and weighed every 24 hours for a period of 7 days. The weight loss is plotted against time. When these points become linear, the best straight line is drawn through the data to obtain the slope. The slope is expressed in grams per hour. The slope is divided by the area of the clamping lid opening to obtain the water vapor transmission in grams per hour per unit area.

Such a base batt having the described permeability is buffed and a polyurethane latex (prepared for example as described above), diluted to 15% solids by weight and containing 0.05 part by weight, per 100 of diluted latex, of sodium dioctyl sulfosuccinate (or other wetting agent such as sodium di(2-ethylhexyl)sulfusuccinate) is sprayed lightly in the form of particles onto the buffed surface to provide a first tie-coat approximately 2 mils thick. The particles typically have a size range from .0002 to .006 inch, although smaller and larger particles may be present. The batt is passed through an oven heated to 110° F. to remove the water.

The following composition is prepared:

| Ingredients | Parts Dry | Parts Wet |
| --- | --- | --- |
| Polyurethane elastomer | 66.7 | 66.7 |
| Polyurethane latex (50% solids) | 33.3 | 66.6 |
| Tetrahydrofuran | | 903 |
| Black pigment | 4.0 | 4.0 |

The polyurethane elastomer may be the previously described reaction product of 1 mole of polytetramethylene glycol having a molecular weight of 2000, 1 mole of butane diol, and 2 moles of diphenylmethane diisocyanate. The polymer is milled at 350° F. to make it more readily soluble in the tetrahydrofuran. The polyurethane latex may be as previously described. The latex imparts a "stickiness" and low melt tack desirable in the fibrous tie-coat. The composition is sprayed onto the surface of the base batt bearing the tie layer as the batt moves under the spray gun at the rate of 18 inches per minute. The material is electrostatically sprayed at the rate of 45 grams (wet) per minute, area covered 1.75 square feet. At the same time a second spray source sprays into the polyurethane spray cellulose flock (e.g., average particle length 50 microns, length 17 microns; 98% passes through a 100 mesh screen) carried in an air stream in amount equal to 7% (by weight, based on the weight of polyurethane solids). Sufficient air is passed through the polyurethane spray system (e.g., 90 p.s.i.) to fully atomize the polyurethane composition spray. The spray gun is located approximately 12 inches from the prepared surface of the batt so that the fibers from the spray are essentially dry when they strike the batt surface. The fibrous tie layer thus laid down is approximately 1 to 2 mils thick. The polyurethane fibers produced are approximately 2 microns in diameter, and vary in length from ¼ inch to 2 or 3 inches. The fibers produced are extremely uniform in diameter.

Another composition is prepared by dissolving, in 900 parts of tetrahydrofuran, 100 parts of a polyurethane elastomer, this time derived from 1 mole of polytetramethylene glycol having a molecular weight of 1,000, 2 moles of butane diol and 3 moles of diphenylmethane diisocyanate, as described above. The elastomer is milled at 350° F. to make it more readily soluble in the tetrahydrofuran. The solution is sprayed onto the fibrous tie layer in the manner previously described, with a simultaneous spray of cellulose flock, to lay down a fibrous layer. On a single such pass a layer approximately 2 mils is deposited. The polyurethane fibers produced have the size characteristics previously set forth for the fibers forming the fibrous tie layer. The assembly is passed under the spray head approximately 15 times, to result in a total lay-down of approximately 30 mils of loose batt fibrous polyurethane (admixed with cellulose flock).

At this point the total thickness of the initial non-woven base batt, plus the successive sprayed layers, is approximately 75–80 mils.

The following color coating formulation is prepared:

| | Parts by weight |
|---|---|
| Cellulose nitrate | 79.3 |
| Polyurethane elastomer | 20.7 |
| Solvent (e.g., tetrahydrofuran) | 1960 |
| Pigment | 19.5 |
| Wetting agent (e.g., reaction product of 10 moles of ethylene oxide with oleic acid; "Emulphor ELA") | 28.6 |

This color coating is sprayed at the rate of 18–25 grams (wet) per minute (area covered 3 square feet) onto the porous surface of the previously deposited batt of sprayed polyurethane fibers. The color coating tends to sink into the polyurethane batt, thereby resulting in a permeable coating. The color coating may be applied from multiple sprays. The assembly is dried in a circulating air oven and/or by heated platens to insure removal of all solvent.

Thereafter the solvent-free assembly (not preheated) is passed to the extended nip between an embossing roll heated to a temperature of 275–235° F. and a conformable back-up member to impress a leather-like grain on the fibrous polyurethane surface, and at the same time compacting and consolidating the fibrous layers. The material after embossing is approximately 0.055–0.060″ thick. The compaction takes place substantially entirely in the sprayed polyurethane fiber layer.

Thus the product finally produced comprises a non-woven base fabric and essentially a second non-woven fabric layer which has been developed on top of the first non-woven layer by spray methods.

In a modification of this example the non-woven base (prior to the application of the polyurethane latex tie coat) is knife coated with a frothed polyurethane latex in a thickness of from 0.050 to 0.125 inch. The latex (50% solids) is frothed to a wet density of 175 grams per liter by whipping.

A woven cotton sheeting (117 warp threads, 127 fill threads, having a weight of 2.3 ounce per square yard) is married onto the surface of the frothed latex layer with very light pressure. The composite is then passed through an oven heated at 220° F. for 5 minutes. This serves to dry the latex later. This composite is then passed through a consolidating roll assembly with the consolidating roll heated to a temperature of 275–325° F. to heat-press the cotton sheeting firmly into the polyurethane foam layer; the foam decreases in thickness by about 70% of its original thickness. The foam layer functions to insure a permeable adhesive bonding between the basic non-woven fabric and the reinforcing woven cotton sheeting. Thereafter the tie layer of polyurethane latex is applied to the cotton sheeting and the rest of the steps repeated as described above.

A particularly advantageous feature of the invention resides in the employment of a relatively thin tie layer of sprayed polyurethane fibers having a relatively low softening temperature to bond a thicker body layer or batt of sprayed polyurethane fibers having a relatively higher softening point, which serves as highly abrasion-resistant wearing surface that is also capable of retaining embossed detail. The ability of the intermediate sprayed fibrous tie layer (based on a polyurethane derived from a polyether glycol having a molecular weight of approximately 2000 for example) to flow readily at slightly elevated temperatures insures good bonding of the main body batt of sprayed fibers (based on a polyurethane derived from a polyether glycol having a molecular weight of approximately 1000 for example) will be effected during the described hot compacting step, to produce a strong, well knit final laminate.

Distinctive features of the product produced include:

A. Prior to any further treatment, such as finishes, polishes, etc., the surface is extremely porous and will absorb water. That is, the product prior to further treatment such as finishes, polishes, etc., has basically the same properties as leather. It passes both air and water vapor, and like leather, will absorb some water through the surface. Surface treatment of leather, and of the present product, reduces the porosity of the surface; the treated product has a desirable degree of permeability without absorbing water to an undesirable degree.

B. The finished product has a water vapor transmission of 8–23 grams per hour per square meter.

C. Good abrasion resistance.

D. Hand, feel, fold similar to leather.

E. May be handled on conventional shoe making equipment.

In a modification of the invention, the non-woven base or substrate is made of leather, particularly low quality leather. This form of the invention provides a way of "upgrading" low quality leather, since a low quality leather base, when provided with a non-woven fibrous elastomeric polyurethane layer in accordance with the invention, has the appearance and qualities of high grade top grain leather. It will be understood that leather is often split so that the top surface, referred to as "top grain" is removed. Top grain leathers are more expensive than the split portion which remains after removing the top grain. The split leather surface does not have a surface quality or appearance which permits it to be used in applications where a highly finished, good appearing, surface is required. Such split leather surfaces have sometimes been improved in appearance by applying vinyls, etc., to the surface. The application of such materials by conventional means results in a closing of the leather surface, thereby rendering it impermeable to the transmission of air and water vapor. However, by building up a porous polyurethane body layer on a base of split leather or an unsplit leather of low quality (e.g. leather marred by surface scratches, etc.) by the method of the invention, the permeability is retained. No changes are necessary in the process as described except for the substitution of leather as the non-woven fibrous base material. This substitution may be regarded as the substitution of a natural non-woven fibrous batt (leather) for a man-made non-woven base.

Having thus described our invention, what we claim and desire to protect by Letters Patent is:

1. A method of making a microporous leather-like sheet material comprising in combination the steps of
   (a) providing a fibrous base which is permeable to water vapor;
   (b) applying an elastomeric adhesive composition in the form of tacky discrete particles deposited on a surface of the said base to form on said surface a permeably tie coat of discrete solid elastomeric particles which adhere to each other and to the said base;
   (c) spraying a solution of a polyurethane elastomer to form tacky fibers, depositing the resulting tacky fibers on the assembly resulting from (b) to form a permeable adherent batt of polyurethane fibers thereon; and
   (d) compacting the resulting assembly to about 50–85% of its original thickness by pressing the assembly at elevated temperature.

2. A method as in claim 1 in which the said fibrous base in (a) is a batt of non-woven randomly interlaced fibers, and the elastomeric adhesive composition in (b) is a polyurethane aqueous latex.

3. A method of making a microporous leather-like sheet matterial comprising in combination the steps of
   (a) providing a permeable base batt of non-woven randomly interlaced fibers having a water vapor transmission rate of at least 10 grams per hour per square meter;
   (b) spraying an elastomeric polyurethane aqueous latex into the form of tacky adhesive particles, depositing said particles on a surface of the batt to form on said surface a permeable tie coat of discrete solid polyurethane particles which adhere to each other and to the batt, and thereafter removing residual moisture from the particles;
   (c) spraying a solution of a polyurethane elastomer containing an elastomeric polyurethane aqueous latex to form tacky fibers, and depositing the resulting tacky fibers on the assembly resulting from (b) to form a permeable adherent tie-coat of fibers thereon;
   (d) spraying a solution of polyurethane elastomer to form tacky fibers, and depositing the resulting tacky fibers on the assembly to form a permeable adherent body layer of fibers thereon; and
   (e) embossing the assembly resulting from step (d) with a leather-like surface grain while compacting the assembly to about 50 to 85% of its original thickness with an embossing roll heated to a temperature within the range of from 180° F. to 350° F.

4. A method as in claim 3 in which the solution of a polyurethane elastomer in step (d) further contains vinyl resin.

5. A method as in claim 3 in which in step (c) the said tacky fibers immediately after spraying are intermingled, while suspended in air, with flock and the resulting mixture of tacky fibers and flock is deposited on the assembly resulting from (b) to form a permeable adherent tie coat of mixed polyurethane fibers and flock thereon, and in step (d) the said tacky fibers immediately after spraying are intermingled, while suspended in air, with flock and the resulting mixture of tacky fibers and flock is deposited on the assembly resulting from (c) to form a permeable adherent body layer of mixed polyurethane fibers and flock thereon.

6. A method as in claim 3, in which, subsequent to step (a) and prior to step (b), the following steps are performed:
   (i) the said batt provided in (a) is coated with a layer of frothed elastomeric latex;
   (ii) a sheet of reinforcing fabric is married to the surface of the layer of froth; and
   (iii) the assembly is compacted to from 20 to 40% of its original thickness by pressing against a compacting means heated to a temperature within the range of from 180° F. to 350° F.

7. A method as in claim 6, in which the said layer of frothed elastomeric latex is a layer of frothed elastomeric polyurethane latex.

8. A method as in claim 3, in which subsequent to step (c) and prior to step (d) there are performed the following steps:
   (i) providing a layer of permeable reinforcing fabric;
   (ii) applying an elastomeric adhesive deposit to a surface of said reinforcing fabric;
   (iii) pressing the reinforcing fabric into contact with the assembly resulting from step (c), with the adhesive-coated surface of the reinforcing fabric in contact with the fibrous tie coat applied in step (c), said pressing being effected by a pressing means heated to a temperature within the range of from 180° to 350° F. to unite the reinforcing fabric to the fibrous tie coat;
   (iv) spraying an elastomeric adhesive composition into the form of tacky discrete particles, depositing said particles on the surface of the reinforcing fabric to form on said surface a permeable layer of discrete solid elastomeric particles which adhere to each other and to the reinforcing fabric; and
   (v) thereafter spraying a solution of a polyurethane elastomer containing an elastomeric polyurethane aqueous latex to form tacky fibers and depositing the resulting tacky fibers on the said permeable layer of elastomeric particles, and subsequently carrying out steps (d) and (e) as in claim 3.

References Cited

UNITED STATES PATENTS

| 2,551,035 | 5/1951 | Miller | 117—17 X |
| 3,252,848 | 5/1966 | Borsellino. | |
| 3,296,016 | 1/1967 | Murphy. | |

ROBERT F. BURNETT, Primary Examiner

LINDA M. CARLIN, Assistant Examiner

U.S. Cl. X.R.

156—209, 279, 280; 161—64, 85; 117—104, 140